May 13, 1958

M. J. NAGY 2,834,559

FISHING REEL

Filed Nov. 30, 1953

MICHAEL J. NAGY,
INVENTOR.

BY *George W. Smyth.*

ATTORNEY.

May 13, 1958 M. J. NAGY 2,834,559
FISHING REEL
Filed Nov. 30, 1953 4 Sheets-Sheet 2

MICHAEL J. NAGY,
INVENTOR.

BY George J. Smyth
ATTORNEY.

May 13, 1958     M. J. NAGY     2,834,559

FISHING REEL

Filed Nov. 30, 1953     4 Sheets-Sheet 3

MICHAEL J. NAGY,
INVENTOR.

BY George J. Smyth

ATTORNEY.

May 13, 1958

M. J. NAGY 2,834,559

FISHING REEL

Filed Nov. 30, 1953

MICHAEL J. NAGY,
INVENTOR.

BY *George J. Smyth*

ATTORNEY.

United States Patent Office 2,834,559
Patented May 13, 1958

2,834,559

FISHING REEL

Michael J. Nagy, Inglewood, Calif.

Application November 30, 1953, Serial No. 395,107

16 Claims. (Cl. 242—84.21)

This invention relates to a fishing reel of the type known as a spinning reel in which the fishing line is played out in the course of a cast by unwinding with a peeling action from one end of a stationary spool.

It is desirable that such a fishing reel be a compact and efficient mechanism that is sufficiently flexible and versatile in operation to meet the variety of requirements that may arise in fishing procedures. At one moment it is required to give the line maximum freedom to peel off the reel for the purpose of making a cast. At a subsequent moment, it is required to snub the line as the cast is completed. At another moment, the requirement is to reel in the line rapidly in preparation for repeating the cast. If a fish is caught on the end of the line, the reel must be operative to wind in the line for landing the fish but at the same time must permit the line to play out as may be necessary to keep the fish from breaking the line.

Since these various requirements often arise in rapid succession, a further requisite is that the fishing reel be subject to instant control. The control mechanism should be simple to operate and the control manipulations should be of a character natural for the fisherman. Preferably the only control required apart from the normal crank operation to reel in the line is a simple finger-actuated control that serves to release the line for making a cast and to snub the line in the later moments of the cast.

In addition to these requirements, it is highly desirable to avoid a mode of operation on the part of the reel that repeatedly creates a twist in the fishing line. Such a twist is commonly caused by a mode of operation in which the spool axis is turned transversely of the axis of the fishing rod for rotation of the spool to reel in the line and in which the spool is returned to parallel relation with the rod and then held against rotation in such relation to permit the line to peel from the spool in the course of a cast. To avoid such creation of a twist in the fishing line, the reeling operation should be the simple reverse of the peeling action, i. e., the reel should remain positioned in substantially the same axial direction during both the peeling operation and the rewinding operation.

It is further desirable that such a spinning reel be adapted for optional right hand and left hand cranking operation. With such option it is unnecessary to supply different fishing reels for right-handed and left-handed fishermen and the same fishing reel may be used by different fishermen in succession without concern for whether or not the fishermen are either right handed or left handed.

The present invention meets these various requirements and provides the desired features and the desired mode of operation by a reeling mechanism in which a reel that is stationary, or at least is normally stationary, is mounted with its axis permanently parallel with the axis of the fishing rod to permit the fishing line to peel off the front end of the spool in the course of a cast. Cooperative with this spool is a rotary winding means coaxial with the spool that is axially movable between a winding position overhanging the spool end and a more forward retracted position. The configuration and dimensions of the winding means are such that in its overhanging position it automatically engages the line for the winding operation and when retracted forward automatically releases the line.

A feature of the invention is that the automatic action for engagement and disengagement of the line is caused simply by the change of angle of the line relative to the winding means as the winding means shifts axially over its range of positions. The winding means has at least one shoulder positioned near its periphery to intercept the line at one angle of the line relative to the winding means and to clear the line at another angle of the line relative to the winding means.

A further feature of the invention is the concept of making the winding means movable axially through a short range of forward retracted positions and combining therewith means to snub the line, the snubbing means being responsive to this short range of movement of the winding means. Thus the winding means may have one position or range of positions for reeling in the line, a forward retracted limit position to snub the line, and a less forward retracted position at which the line is free to peel off the end of the stationary spool. In using such an arrangement the problem of control is to provide suitable means to shift the rotary winding means axially for these three functions, namely the function of reeling in the line, the function of snubbing the line at the forward limit position of the winding means, and the function of completely freeing the line for the peeling action at the slightly less forward position.

In the preferred practice of the invention, exceptional compactness with reference to transverse dimensions is achieved by providing a spool having an axial passage therethrough and by mounting the forward winding means and snubbing means on an axially movable actuating shaft extending through the spool passage. A suitable spring presses the shaft towards its forward limit snubbing position but normally the shaft is releasably held in a rearward position or range of positions for winding operation of the winding means. It is merely necessary to release the shaft from its winding position or range of winding positions whenever it is desirable to snap the shaft forward to its snubbing position and only a slight reverse axial shift of the shaft from the snubbing position is required for complete release of the line.

As will be explained, the invention contemplates the provision of a control button operable by finger pressure against spring pressure from a normal first position restraining the shaft to a second position releasing the shaft for the snubbing action. With the cessation of finger pressure against the control button, the control button is returned to its normal first position by spring pressure and the same spring pressure actuates a cam mechanism to cause the slight reverse shift of the shaft required for releasing the line. Thus the application of finger pressure will release the shaft from its winding position to snub the line and simply relaxing the finger will cause the shaft to retract slightly to release the line.

In the preferred practice of the invention, engagement means controlled by the push button releasably engages a peripheral groove in the shaft to hold the shaft retracted and at the same time permit the shaft to rotate. In this regard, a feature of the invention is the provision of such a groove of a configuration to cooperate with the engagement means to carry out a number of different functions. One function is to cooperate to restrain the shaft against the pressure of the spring that provides the snubbing force. A second function is to reciprocate the shaft thereby to reciprocate the winding means in the course of the winding operation. Such reciprocation, which is accomplished by a reversing helical portion of the groove, serves the useful purpose of distributing the windings along the length of the stationary spool. A third function is to restore the winding means from its range of release positions to its range of winding positions in response to rotation of the shaft. This function is accomplished by an additional helical portion of the groove which is effective whenever the shaft is rotated in its winding direction while the control button is free from finger pressure.

It is further desirable to so construct the reel mechanism that the line will unwind from the spool whenever the tension in the line becomes excessive, the line being free to unwind even when the reel mechanism is operating in the manner that normally causes the line to be wound onto the spool. In one practice of the invention, this problem is solved by mounting the spool in a rotatable manner, but with means in frictional engagement with the spool that normally keeps the spool from rotating. When the tension in the line reaches a predetermined magnitude, the spool yields by unwinding rotation to prevent further undue increase in the tension of the line. In a second practice of the invention, the spool is permanently mounted in a non-rotatable manner but the reeling member is mounted on the shaft by friction means that yields whenever the tension in the line reaches a predetermined magnitude.

The various features and advantages of the invention will be understood from the following detailed description of the presently preferred embodiments of the invention considered with the accompanying drawings.

In the drawings, which are to be regarded as merely illustrative:

Figure 1 is a side elevation of the presently preferred embodiment of the invention;

Figure 2:
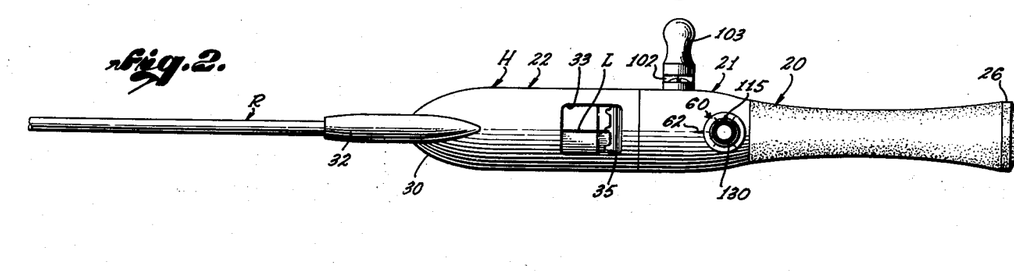
Figure 2 is a plan view of the structure shown in Figure 1.
Figures 3, 4:
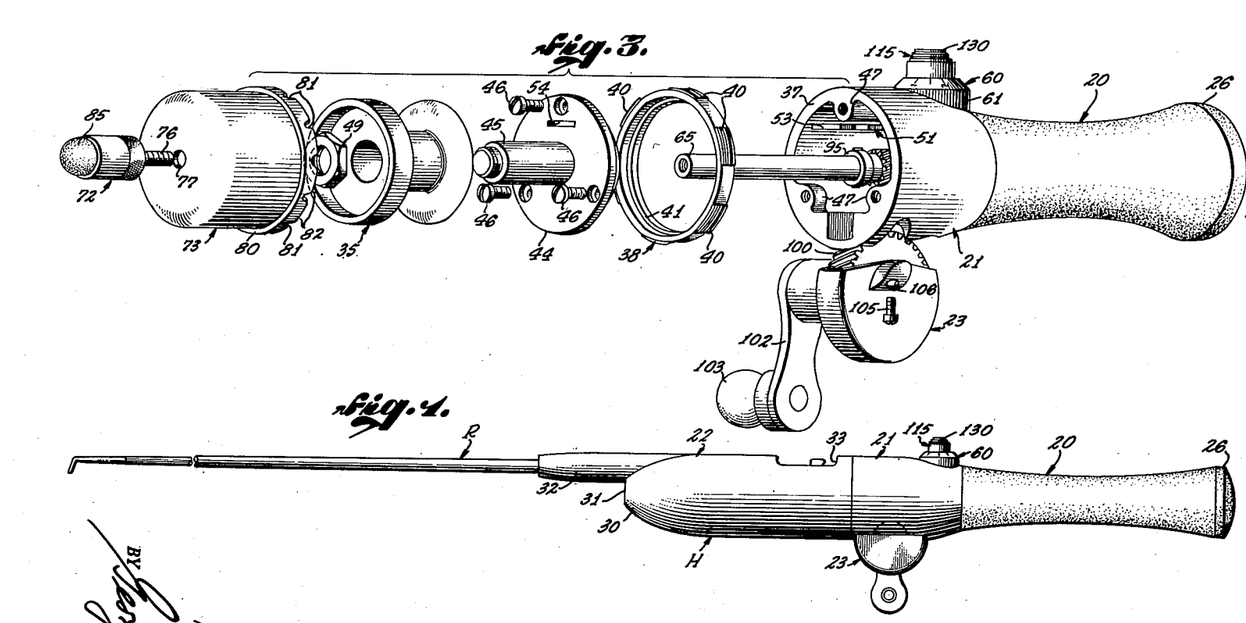
Figure 3 is an exploded view showing the cooperating parts of the forward portion of the reel mechanism.
Figure 4 is a longitudinal sectional view on an enlarged scale showing the moving parts of the reel.

The first embodiment of the invention shown in Figures 1 to 11 has a housing or casing, generally designated H, which is adapted to serve as a handle for a fishing rod R. The housing H which is of generally cylindrical configuration is, in this example of the invention, divided into four housing sections, namely: a rear handle section 20; an intermediate section 21; a forward section 22; and a small bottom section 23, which is mounted on the underside of the intermediate section 21. As shown in Figure 4, the handle section 20 of the housing, which is of tubular configuration, is mounted by screw threads on a rearward extension 24 of the intermediate housing section 21. This handle section 20 preferably has an outer layer 25 of cork and is closed at its butt end by a suitable plastic or rubber-like cap member 26. The forward housing section 22 is connected to the intermediate housing section 21 in a quickly detachable manner, as will be explained, and the bottom housing section 23 is reversibly connected with the intermediate housing section.

The forward housing section 22 comprises a relatively thin cylindrical shell with a tapered nose 30 formed with an axial opening 31 and has a forwardly extending tubular portion 32 which is adapted to serve as mounting means to embrace and retain the butt end of the fishing rod R. The forward housing section 22 also has a suitable opening 33 on its upper side to serve as a window adjacent a spool 35 inside the housing on which is wound a fishing line L.

Figures 7, 8, 9, 10, 11:
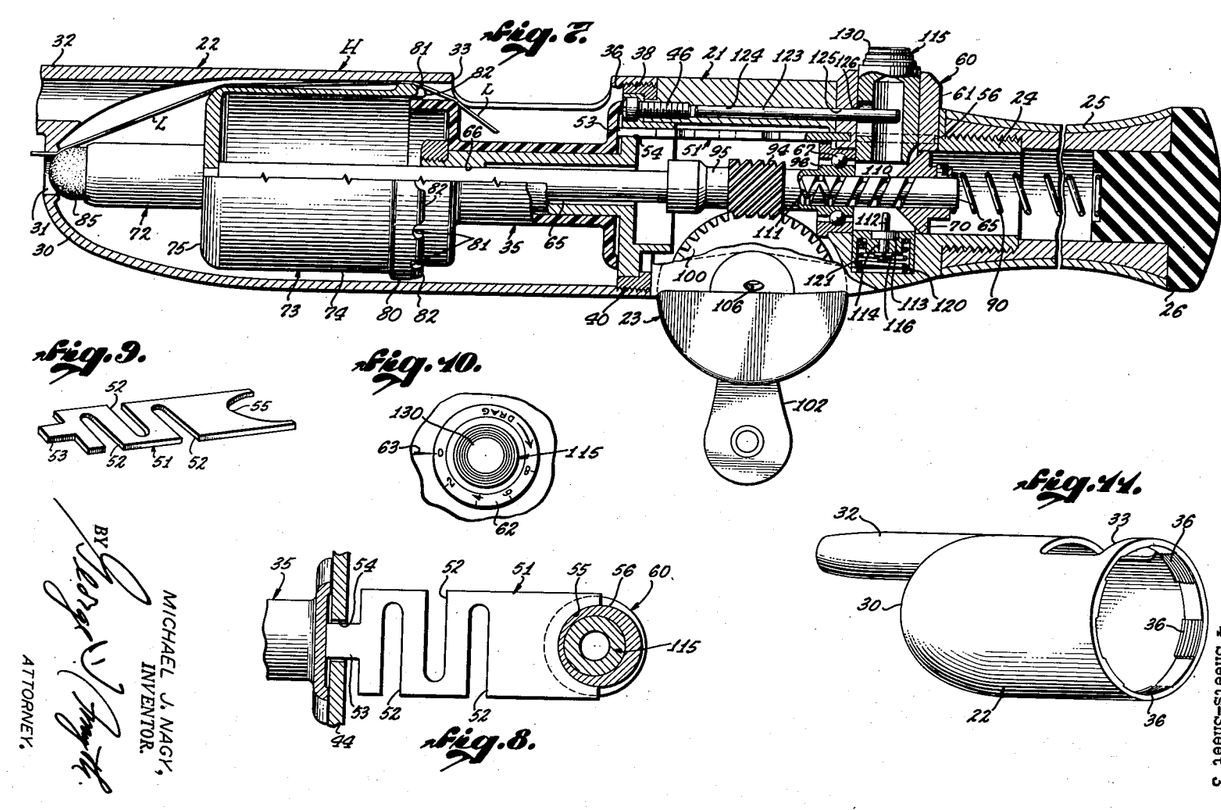
Figure 7 is a view similar to Figure 4, partly in section and partly in side elevation showing the parts of the mechanism in position for snubbing the fishing line.
Figure 8 is a section taken as indicated by the line 8—8 of Figure 5, showing friction means for normally holding the spool of the reel against rotation.
Figure 9 is a perspective view of the friction member shown in Figure 8.
Figure 10 is a plan view of the indexed rotary means for adjusting the friction pressure against the spool.
Figure 11 is a perspective view of the forward section of the reel housing.

It is contemplated that the forward housing section 22 will be mounted on the intermediate housing section 21 by a bayonet type connection. For this purpose, the forward housing section 22 is formed at its rear end with a plurality of circumferentially spaced lands 36, each of which is formed with multiple screw threads as best shown in Figure 11. As best shown in Figure 3, the forward end of the intermediate housing section 21 has a flat annular face 37 for abutment by a bayonet ring 38. The bayonet ring 38 has a series of circumferentially spaced external lands 40 which are formed with multiple screw threads, as shown, to engage the corresponding multiple threads on the lands 36 of the forward housing section 22.

The bayonet ring 38 is suitably mounted on the annular face 37 of the intermediate housing section 21 in a manner that permits rotational adjustment of the bayonet ring during the factory assembly of the device, so that when the forward housing section 22 is mounted on the intermediate housing section 21 with the screw threads tightly engaged, the forward housing section 22 may be accurately oriented about its axis with the window opening 33 and the forward tubular portion 32 positioned at the upper side of the housing when the bottom housing section 23 is at its lowermost position.

In the construction shown in the drawings, the bayonet ring 38 has an inner circumferential shoulder 41 to seat a circular flange 44 of a tubular spindle 45 and the circular flange 44 is connected with the intermediate housing section 21 by three screws 46. The screws 46 thread into three corresponding ears 47 on the forward end of the intermediate housing section 21. Thus, the circular flange 44 of the tubular spindle 45 serves as clamp for adjustably mounting the bayonet ring 38 on the forward end of the intermediate housing section 21 and the three screws 46 are tightened at the factory to hold the bayonet ring permanently at its adjusted position.

Mounted on the tubular spindle 45 and secured thereon by a suitable nut 49 is a spool 35 for the fishing line L and in the preferred practice of the invention, this spool is made of a suitable plastic material such as nylon which will provide a smooth surface at the end of the spool along which the line L will slide freely as it unwinds with peeling action. In this first embodiment of the invention, it is contemplated that the spool 35 will normally remain stationary on the spindle 45 but will yield by rotation whenever the tension in the line L reaches a predetermined magnitude. For this purpose, the spool 35 may be held against rotation by suitable friction means such as a friction member 51 shown in Figures 8 and 9.

The friction member 51 is a flat piece of suitable material having staggered slots 52 from its opposite sides to provide a certain degree of longitudinal resiliency to permit the friction member to act in compression in the manner of a coil spring. A suitable laminated plastic sheet, for example, will have the desired longitudinal resiliency when cut to the configuration shown. The butt end of the friction member 51 is reduced in width to form a tongue 53 that extends through a slot 54 in the circular flange 54 of the tubular spindle, the end of the tongue pressing against the rear end of the spool 35 as shown in Figure 4.

The rear end of the friction member 51 is cut to circular configuration as shown at 55 to seat into an eccentric circumferential groove 56 in a bushing 60 that is rotatably mounted in the intermediate housing section 21. As best shown in Figure 3, the upper end of the bushing 60 which protrudes from the housing, has a knurled peripheral surface 61 for convenient finger manipulation and, as best shown in Figure 10, the upper end of the bushing has a suitable scale 62 marked thereon to serve as index means. It is apparent that the pressure exerted by the friction member 51 against the spool 35 may be varied by manual rotation of the bushing 60 and that the scale 62, in cooperation with a fixed index marked 63 on the surface of the housing, will afford guidance in setting and resetting the frictional arrangement for different degrees of drag on the line L.

The spindle 45, being tubular, forms an axial passage through the spool 35 to slidingly embrace an actuating shaft 65, which shaft is adapted for both rotary movement and longitudinal movement. The forward end of the tubular spindle 45 is reduced in internal diameter to form a forward bearing 66 in which the shaft is free to slide longitudinally. The shaft is also slidingly supported by a ball bearing 67 in the intermediate housing section 21. In addition the rear end of the shaft is provided with a conical member 70 which may cooperate with the surrounding circular housing wall for additional support of the shaft.

Mounted on the front end of the shaft 65 by a suitable end member 72 is a cup shaped winding member 73 having a cylindrical wall 74 and an end wall 75. The end member 72 has a shank 76 that extends through an aperture 77 in the end wall 75, the shank 76 being threaded into an axial bore 78 on the front end of the shaft to clamp the winding member securely to the shaft. The winding member 73 is formed with a smooth circumferential rib 80 adjacent its rearward rim and is provided with at least one forwardly extending shoulder on its rim for sliding engagement with the line L for winding the line onto the spool 35. In this instance, the rim of the winding member 73 has a plurality of equally spaced recesses 81 to form a plurality of rearwardly extending projections 82, the projections 82 providing a corresponding plurality of shoulders. Any one of the shoulders or side surfaces of the projections 82 may engage the line for the winding action and the provision of a plurality of circumferentially spaced shoulders insures that the line will be engaged by one of the shoulders promptly whenever the winding member is rotated in its winding position.

Preferably, but not necessarily, the winding member 73 has a range of winding positions and is adapted to reciprocate through this range for distributing the line along the length of the spool 35. It is also preferred that the winding member have a range of retracted positions at which it is out of engagement with the line so that axial movement of the winding member within this retracted range may be utilized to control and operate means to snub the line. Thus, in this embodiment of the invention, the winding member 73 is movable from a rearward winding position in its range of winding positions to a limit forward retracted position for snubbing the line and may be withdrawn from this snubbing position slightly to a second retracted position to release the line.

With the winding member 73 adapted for operation in this manner, it is merely necessary to mount a snubbing member 85 on the end member 72 of the shaft to cooperate with the housing for snubbing the line. The snubbing member 85 may be in the form of a body of rubber-like material seated in a recess 86 (Fig. 4) in the end member 72, the body being of the configuration shown to fit against the rim of the forward housing opening 31 as shown in Figure 7. Figure 4 shows the winding member 73 slightly withdrawn from the retracted position of Figure 7 to the less retracted second position at which the line is still free from engagement by any projection 82 of the winding member. At this second retracted position, the snubbing member 85 is spaced away from the rim of the housing opening 31 to permit the line to pass freely through the opening.

Figures 4, 4A, 5, 6:
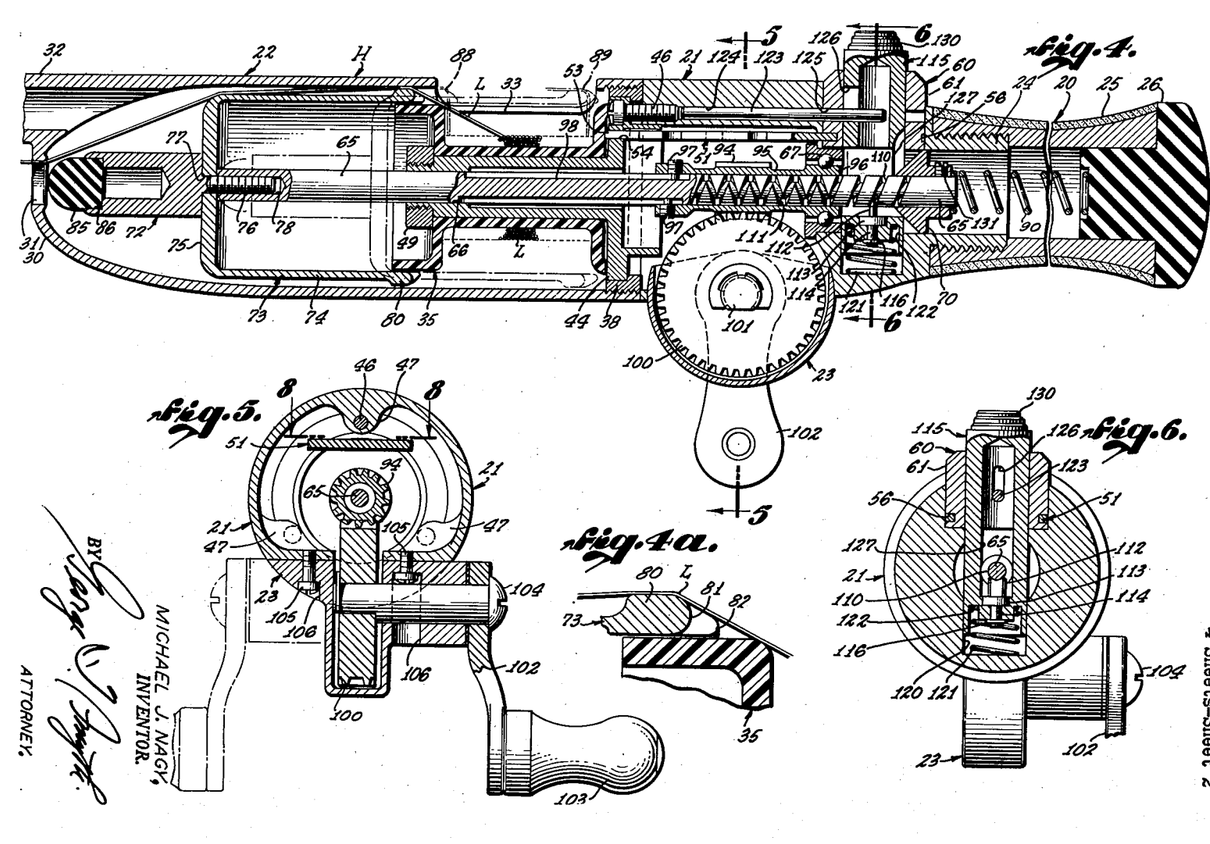
Figure 4a is an enlarged detail of Figure 4.
Figure 5 is a transverse section taken as indicated by the line 5—5 of Figure 4.
Figure 6 is a transverse section taken as indicated by the line 6—6 of Figure 4.

The manner in which the line L is free to unwind from the spool 35 by peeling action over the front end of the spool may be understood by reference to Figure 4a which is an enlargement of a portion of Figure 4. It will be apparent in Figure 4a that the angle at which the line L makes contact with the rim 80 of the winding member 73 depends upon the longitudinal position of the winding member relative to the spool 35. In the relative positions of the winding member and spool shown in Figure 4a the line L makes contact with the smooth circumferential rib 80 of the winding member at a relatively low angle that places the line outside of the circumference of the winding member projections 82 so that the line is free to slide around the end of the spool and around the circumferential rib 80 of the winding member without interference by any of the winding member projections 82. On the other hand, when the winding member 73 is at a more rearward winding position shown in dotted lines at 88 in Figure 4, the line L will make contact with the winding member at an angle to cause the line to be engaged by one of the winding member projections 82. It is contemplated that the winding member 73 will reciprocate over a range of winding positions between the winding position 88 and a still further rearward winding position shown in dotted lines at 89 in Figure 4, to distribute the wound coils of the line L along the length of the spool 35.

It is desirable to provide a control arrangement that will cause the winding member 73 to snap forward in an instantaneous manner from any position in its winding range to the snubbing position shown in Figure 7. A feature of the invention in this regard is the provision of a spring such as the coil spring 90 to continuously press the shaft forward and the provision of manually releasable means to hold the shaft in winding position and to release the shaft for snap action forward when desired. The shaft may conveniently be held against spring actuated longitudinal movement by means in engagement with a suitable circumferential groove in the shaft so that it is merely necessary to disengage this means from the groove to permit the shaft to move to the forward snubbing position. In the present embodiment of the invention, the groove in the shaft is of helical configuration to cause longitudinal movement of the shaft in response to rotation of the shaft.

Any suitable means may be provided to rotate the shaft 65 in a longitudinally movable manner. In the construction shown, a helical driven gear 94 is integral with a sleeve 95 that slidingly surrounds the shaft, and the sleeve in turn is integral with the inner race 96 of the ball bearing 67. The sleeve 95 is keyed to the shaft 65 by means of a suitable set screw 97 that extends into a longitudinal keyway 98 in the shaft. Thus, rotation of the driven gear 94 will rotate the shaft while permitting the shaft to shift longitudinally throughout the length of the keyway 98. The helical driven gear 94 is in mesh with a helical drive gear 100 which is mounted on a stub shaft 101. The stub shaft 101 is journaled in the bottom housing section 23 and a suitable crank 102, having a handle 103, is mounted on the end of the stub shaft by a suitable screw 104.

The bottom housing section 23 carrying the driven gear 100, the stub shaft 101, and the crank 102 is preferably releasably secured to the intermediate housing section 21 by a pair of screws 105 which are accessible through corresponding bores 106. The two screws 105 secure the bottom housing section 23 in a reversible manner, i. e., permit the bottom housing section with its crank mechanism to be mounted at the option of the user either in the manner shown in solid lines in Figure 5 or in the opposite manner indicated by the broken lines. The crank 102 will actuate the shaft 65 in the desired manner in either position. The position of the bottom housing section 23 of the housing shown in solid lines in Figure 5 permits the fishing rod to be handled with the left hand while the right hand actuates the crank 102. If the arrangement is reversed as shown by the broken lines in Figure 5, the fishing rod may be held in the right hand and the reel may be cranked by the left hand.

The shaft 65 has a relatively long helical groove 110 corresponding to its full range of longitudinal movement and has a shorter helical groove 111 extending in the opposite helical direction, the second helical groove intersecting the first helical groove and being connected therewith to form a continuous double intersecting helix for reciprocation of the winding member 73 between the two winding positions shown at 88 and 89 in Figure 4. The shaft 65 may be considered as having a single groove having a portion forming two intersecting helixes and another portion forming a single helix in communication with the double helix, the single helix being the portion of the helical groove 110 that extends rearward from the shorter opposite helical groove 111. In response to normal forward hand operation of the crank 102, the shaft 65 rotates in a direction to cause the longer helical groove 110 to move the shaft longitudinally rearward and to cause the opposite shorter helical groove 111 to move the shaft longitudinally forward. Any suitable releasable means may be provided for engagement with the groove in the shaft to cause the desired longitudinal movement of the shaft in response to rotation.

In the construction shown in the drawings, the groove in the shaft 65 is engaged by a follower in the form of a small blade 112. The follower blade 112 is integral with a supporting disc 113 and a concentric shank 114 and is rotatable about the axis of the disc and shank to follow the changes in direction of the groove. The supporting disc 113 is rotatably seated in the lower end of a hollow control plunger 115 with the shank 114 extending through the end of the plunger and secured therein by a small split retaining ring 116.

The control plunger 115 is slidingly mounted at its upper end in the previously mentioned bushing 60 and is slidingly mounted at its lower end in a well or blind bore 120 formed in the intermediate housing section 21. A suitable spring 121 in the blind bore 120 extends into an annular recess 122 in the bottom of the control plunger to urge the control plunger upward to a limit position determined by a stop pin 123, this limit position being shown in Figures 4 and 6. The stop pin 123, which is mounted in a longitudinal bore 124 in the intermediate housing section 21, extends through a slot 125 in the bushing 60 into a slot 126 in the hollow control plunger 115. The slot 125 extends circumferentially of the bushing 60 for at least 180 degrees to permit corresponding rotation of the bushing 60 as required for control of the friction member 51, and the slot 126 in the control plunger 115 extends longitudinally of the plunger in accord with the desired length of operating movement of the plunger.

The control plunger 115 has two diametrically opposite openings 127 in its circumference to straddle the shaft 65 and to permit longitudinal movement of the control plunger, without interference by the shaft. The upper end of the control plunger 115 protrudes from the upper end of the bushing 60 and forms an external control button 130 which may be depressed by finger pressure in opposition to the spring 121.

During normal crank-actuated operation of the shaft 65, the stationary follower blade 112 engages the double helix portion of the groove in the shaft and oscillates about its axis to follow the changes in direction of the groove as required to cause the shaft to reciprocate for reciprocation of the winding member 73 between the two positions 88 and 89 in Figure 4. If the control button 130 is depressed by finger pressure to disengage the follower blade 112 from the groove in the shaft, the spring 90 pressing against the back of the conical member 70 on the shaft will snap the shaft forward to the limit snubbing position shown in Figure 7 where the snubbing member 85 under pressure from the spring cooperates with the rim of the housing opening 31 to grip or snub the line L.

When the shaft 65 is snapped to its forward snubbing position, the nose of the conical member 70 on the rear end of the shaft shifts into the rear diametrical opening 127 of the control plunger 115 and when the control plunger is released for its return upward movement by the second spring 121, the lower edge of the diametrical opening 127 in the plunger moves against the conical member 70 to cause the shaft to retract from the snubbing position shown in Figure 7 to the line-releasing position shown in Figure 4. Thus when the control button 130 is released from finger pressure the conical member 70, cooperating with the control plunger 115, functions as a cam to shift the shaft 65 rearward a sufficient distance to release the line L, the spring 121 that returns the control plunger upward being strong enough to dominate the spring 90 that presses forward against the shaft. Preferably, the conical member 70, which is attached to the shaft 65 by a suitable set screw 131, is made of relatively smooth plastic material such as nylon.

The manner in which the described reel operates to serve its purpose may be readily understood from the foregoing description. To make a cast with the major portion of the line L wound onto the stationary spool 35, the fisherman depresses the control button 130 with his thumb to cause the shaft to snap forward to its snubbing position to snub the line and then swings the fishing rod through the required arc to throw the weighted end of the line forward. Towards the end of this arcuate movement, the fisherman relaxes the finger pressure on the control button 130 to permit the control plunger 115 to retract the shaft to the position shown in Figure 4 thereby to free the line to unpeel from the stationary spool 35 to follow the forward momentum of the weighted end of the line. When the winding member 73 is placed in this position shown in Figure 4, the line is free to slide around the circumference of the winding member as required to unpeel from the stationary spool 35. As previously explained, with reference to Figure 4a, the line makes contact only with the smooth rib 80 at the rim of the winding member and is at an angle out of the range of the rim projections 82 of the winding member.

To reel in the line after a cast, the fisherman rotates the crank 102 forward and the blade follower 112 under pressure from the spring 121 quickly engages the single helix 110 of the groove that extends rearward from the double helix portion of the groove and such engagement shifts the shaft longitudinally rearward to bring the blade follower 112 into the double helix portion of the groove where continued cranking causes the winding member 73 to reciprocate in its winding range between the two positions 88 and 89 of Figure 4. As the rotating winding member 73 is moved rearward from the line-releasing position shown in Figure 4a to the range of winding positions represented by the two positions 88 and 89, the rim prjections 82 of the winding member are brought into position to intersect the line and one of the projections will pick up the line and wind the line onto the stationary spool.

If a fish is caught and places the line L under excessive tension, the normally stationary spool 35 will yield by rotation to the excessive line tension in opposition to the resistance of the frictional member 51 and the spool 35 can be rotated in an unwinding direction in this manner even when the crank is being operated in the opposite winding direction in its range of winding positions.

Figure 12:
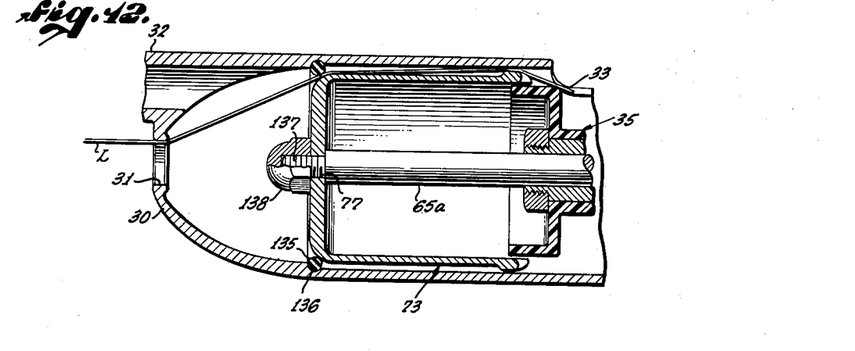
Figure 12 is a fragmentary longitudinal sectional view showing how the invention may be modified for snubbing the line in a different manner.

The modification of the invention illustrated by Figure 12 consists in the provision of a ring 135 of rubber-like material seated in an inner circumferential groove 136 in the housing to cooperate with the front end of the winding member 73 for the purpose of snubbing the line L. In this construction, the shaft 65a is formed with a reduced threaded end portion 137 that extends through the aperture 77 of the winding member and the winding member is secured by a suitable nut 138 threaded onto the reduced end portion 137. When the shaft 65a is released for its spring-actuated forward movement, the body of the winding member 73 presses against the ring 135 to snub the line in substantially the same manner as heretofore described.

Figure 13:
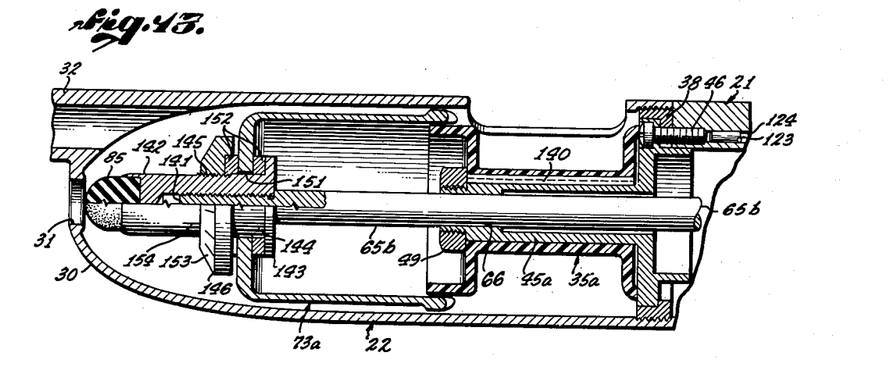
Figure 13 is a fragmentary longitudinal sectional view illustrating another modification of the invention in which the winding member is frictionally mounted on the actuating shaft.

The modified form of the invention shown in Figure 13 is largely identical with the first described embodiment of the invention as indicated by the use of corresponding numerals to designate corresponding parts. In this modification of the invention, the spool 35a is non-rotatably mounted on the tubular spindle 45a, the spool being held against rotation by a suitable spline 140 that engages both the spool and the spindle. Such an arrangement prevents the spool from rotating to relieve excessive tension in the line but the same result is accomplished by mounting the winding member 73a on the shaft 65b in a yieldable manner.

In the construction shown, the shaft 65b has a relatively long reduced end portion 141 onto which is threaded an end member 142 that carries the snubbing member 85. The end member 142 is formed with a radial flange 143 on its inner end and with a smooth cylindrical portion 144 immediately adjacent the flange. Adjacent the smooth cylindrical portion 144, the end member has circumferential threads 145 to receive a suitable nut 146. The end wall of the winding member 73a has a relatively large circular aperture 151 to receive the smooth cylindrical portion 144 of the end member and the end wall of the winding member is sandwiched between two resilient friction rings 152 which may be made of leather or of rubber-like material. It is apparent that the nut 146 may be adjusted to various degrees of tightness to place the two friction rings 152 under various degrees of axial pressure to provide various magnitudes of resistance to rotation of the winding member 73a relative to the shaft 65b. Preferably the nut 146 is provided with a radial scale 153 to be read with reference to an index mark 154 on the end member 142 for guidance in adjusting the frictional resistance to rotation of the winding member relative to the shaft.

It is apparent that this last embodiment of the invention operates in the same general manner as the first described embodiment of the invention, but that excessive tension on the line is relieved by reverse rotation of the winding member relative to the shaft to permit the line to unwind from the stationary spool 35a. In some instances, the tension on the line will be sufficient to hold the winding member 73a stationary while the shaft 65b is being rotated by the crank and in other instances, where the tension in the line is greater, the winding member 73a will actually rotate in reverse direction to unwind the line from the stationary spool even though the crank 102 continues to rotate the shaft 65b in the winding direction.

My description in specific detail of the presently preferred forms of the invention will suggest to those skilled in the art various changes, substitutions and other departures from my disclosure that properly lie within the spirit and scope of the appended claims.

I claim:

1. In a reel of the character described to control a fishing line, the combination of: a spool to receive wound turns of the line; means to support the spool on a fishing rod with clearance around one end of the spool to permit the line to unwind by peeling off the spool end while the spool is stationary; manually rotatable winding means adapted to overhang said spool end for slidable engagement with the line to wind the line onto the spool with the spool stationary, said winding means being retractible from said spool end in the general direction of the axis of the spool to a position to release the line for unwinding by said peeling action, and a housing provided by said support means and enclosing said winding means, said housing having an opening for said line in the region of the projected axis of said spool, said housing having a peripheral window in the region of said spool, said manually rotatable winding means being retractible to a position substantially closing said window, said housing being made in two sections having adjacent ends and a ring member being mounted on one of said adjacent ends, said two sections being releasably joined by a bayonet type connection including two sets of multiple circumferentially spaced longitudinal lands, each of which lands has multiple screw threads, one of said sets being on said ring member, the other of said sets being on the other of said two adjacent ends, said ring member being rotatably adjustable on said one adjacent end for circumferential adjustment of the position of said window in the factory assembly of the reel.

2. In a reel of the character described to control a fishing line, the combination of: a spool to receive wound turns of the line, said spool having an axial passage therethrough; means to support the spool on a fishing rod with clearance around one end of the spool to permit the line to unwind by peeling off said spool end while the spool is stationary; rotary winding means adapted to overhang said spool end for slidable engagement with said line to wind the line onto the spool with the spool stationary, said rotary means being retractible from said spool end in the general direction of the axis of the spool to a position to release the line for unwinding by said peeling action; an axially movable shaft carrying said winding means, said shaft having a continuous peripheral groove forming two opposite intersecting helices; means to rotate said shaft; follower means to engage said groove for reciprocation of the shaft to cause said winding means to distribute the turns of said line along said spool, said follower means being retractible to release said shaft for axial movement of said winding means to its retracted position; and yielding means to urge said winding means to its retracted position when said follower means is retracted.

3. A reel as set forth in claim 2 in which said shaft has an additional helical groove communicating with said first mentioned groove for engagement by said follower means to return said shaft from its retracted position to a position with said winding means at an overhanging winding position.

4. In a reel of the character described to control a fishing line, the combination of: a spool to receive wound turns of the line; means to support said spool on a fishing rod with clearance around one end of the spool to permit the line to unwind by peeling off the spool in one direction generally axial of the spool while the spool is stationary; rotary winding means to overhang said spool in sliding engagement with said line to wind the line onto the spool with the spool stationary, said winding means being retractible in said axial direction to a position to release the line to unwind by the peeling action; an axially movable shaft carrying said winding means;

actuating means to rotate said shaft; yielding means to urge said shaft in said axial direction for retraction of said winding means; means normally in engagement with said shaft in opposition to said yielding means to maintain said winding means in position to wind the line onto the spool; control means manually movable from a normal first position to a second position to release said engagement means from the shaft thereby to cause retraction of the winding means by said yielding means; snubbing means to grip said line in response to movement of said control means to said second position and to release the line in response to the return movement of the control means; and means to return said shaft in the opposite axial direction in response to operation of said actuating means to place said winding means in winding position.

5. A reel as set forth in claim 4 which includes a second yielding means to return said control means to its normal first position whereby release of the control means causes said snubbing means to release the line.

6. A reel as set forth in claim 5 in which said snubbing means includes a snubbing member carried by said shaft to grip said line at a limit position of the shaft in said axial direction of movement of the shaft; and which includes means to shift said shaft slightly from said limit position in response to the return movement of said control means.

7. A reel as set forth in claim 6 which includes a cam member on said shaft cooperative with said control means to shift the shaft from said limit position.

8. In a reel of the character described to control a fishing line, the combination of: a spool to receive wound turns of the line; means to support said spool on a fishing rod with clearance around one end of the spool to permit the line to be unwound by peeling off the spool in one direction generally axial of the spool while the spool is stationary; rotary winding means to overhang said spool in sliding engagement with the line to wind the line onto the spool with the spool stationary, said winding means being retractible in said axial direction to a position to release the line for unwinding by the peeling action; an axially movable shaft carrying said winding means, said shaft having a peripheral groove; actuating means to rotate said shaft; yielding means to urge said shaft in said axial direction for retraction of said winding means; means normally in engagement with said groove in opposition to said yielding means to maintain said winding means in position to wind the line onto said spool; control means normally movable from a normal first position to a second position to release said engagement means from said groove thereby to cause retraction of said shaft and said winding means; and snubbing means to grip said line in response to movement of said control means to said second position and to release the line in response to the return movement of the control means.

9. A reel as set forth in claim 8 in which at least a portion of said groove is helical and is located for cooperation with said engagement means to return said shaft in the opposite axial direction in response to rotation of the shaft thereby to return said winding means to winding position.

10. A reel as set forth in claim 9 in which at least a portion of said groove forms a pair of opposite helices and which includes means for engagement with said groove to reciprocate said shaft thereby to reciprocate said winding means during its winding operation.

11. A reel as set forth in claim 10 in which another portion of said groove is helical and is located on the shaft for cooperation with said engagement means to return said shaft in the opposite axial direction in response to rotation of the shaft thereby to return said winding means to winding position.

12. In a reel of the character described to control a fishing line, of the combination of: a spool to receive wound turns of the line; means to support the spool on a fishing rod with clearance around one end of the spool to permit the line to unwind by peeling off the spool end while the spool is stationary; manually operable rotary winding means to overhang said spool end in a position effective for sliding engagement with said line to wind the line onto the spool while the spool is stationary, said rotary winding means being retractable in the general direction of the axis of the spool to release the line for the unwinding peeling action; snubbing means operative for frictional engagement with said line in response to retraction of said rotary winding means; yielding means to retract said rotary winding means and to create snubbing pressure by said snubbing means; manually releasable means to hold said rotary winding means against complete retraction by said yielding means thereby to maintain said snubbing means inoperative, whereby operation of said manually releasable means causes said yielding means to operate said snubbing means with predetermined snubbing pressure, said manually releasable means being movable between a first normal holding position and a second release position; a second yielding means to urge said manually releasable means in the return direction from its second position to its normal first position; and means responsive to the return movement of said manually releasable means to return said rotary winding means to the position at which it is held by said manually releasable means.

13. In a reel of the character described to control a fishing line, the combination of: a spool to receive wound turns of the line; means to support the spool in a fishing rod with clearance around one end of the spool to permit the line to unwind by peeling off of the spool end while the spool is stationary; rotary winding means having an effective position for sliding engagement with said line to wind the line on the spool while the spool is stationary, said rotary winding means being retractable in the general direction of the axis of the spool to ineffective positions to release the line for the unwinding peeling action; a shaft extending through said spool and carrying said rotary winding means, said shaft being movable from an effective position with said winding means in effective position to an intermediate retracted position and to a limit retracted position with said winding means in retracted ineffective position at both said retracted positions of the shaft; a first snubbing member and a second snubbing member for cooperation to frictionally engage the line, said first snubbing member being fixed, said second snubbing member being movable with said shaft to cooperate with said first snubbing member at said limit position of the shaft; yielding means urging said shaft towards said limit retracted position to provide snubbing pressure between said snubbing members; means to rotate said shaft; means to maintain the rotating shaft in position with said winding means in effective position in opposition to said yielding means, said maintaining means being releasable to permit said yielding means to move the shaft to said limit position and to create pressure between said first and second snubbing members; and means to releasably hold said shaft at said intermediate position in opposition to said yielding means to free the line for the unwinding peeling action.

14. A reel as set forth in claim 13 in which: a manually operable control member is included, said control member having a normal first position and a second position; said maintaining means is responsive to said control member at said second position thereof to release said shaft for longitudinal movement by said yielding means; said means to releasably hold said shaft at said intermediate position is responsive to said manually operable control means at said normal position thereof to limit the longitudinal movement of the shaft at said intermediate position; and a second yielding means is provided to urge said manually operable control member from its second position to its normal first position.

15. A reel as set forth in claim 14 which includes cam means to retract said shaft from said limit position to said intermediate position in response to movement of said manually operable control member from its second position to its normal first position; and in which said second yielding means is strong enough to operate said cam means in opposition to said first yielding means.

16. A reel as set forth in claim 13 in which: said spool is rotatably mounted on said support means; means is included in frictional engagement with the spool to resist forces up to a predetermined magnitude that tend to rotate the spool, whereby the spool will rotate in response to forces of greater magnitude transmitted thereto by the line while the line is engaged by said rotary winding means; said means to releasably hold said shaft at said intermediate position is controlled by an external button; and an adjustable eccentric is included, said eccentric surrounding said button and being rotatable to control the magnitude of pressure of the frictional engagement with the spool.

References Cited in the file of this patent

UNITED STATES PATENTS

| | | |
|---|---|---|
| 876,630 | Gaynor | Jan. 14, 1908 |
| 1,279,695 | Hollis | Sept. 24, 1918 |
| 1,797,774 | Holden | Mar. 24, 1931 |
| 2,190,984 | Gulbrandsen | Feb. 20, 1940 |
| 2,515,896 | Rakoczy | July 18, 1950 |
| 2,535,404 | Fry | Dec. 26, 1950 |
| 2,541,183 | Abele | Feb. 13, 1951 |
| 2,600,558 | Mauborgne | June 17, 1952 |
| 2,613,468 | Hand | Oct. 14, 1952 |
| 2,615,647 | Palmer et al. | Oct. 28, 1952 |
| 2,627,383 | Tibbetts | Feb. 3, 1953 |
| 2,644,647 | Denison et al. | July 7, 1953 |

FOREIGN PATENTS

| | | |
|---|---|---|
| 924,148 | France | Mar. 3, 1947 |